United States Patent
Wang et al.

(10) Patent No.: US 8,440,335 B2
(45) Date of Patent: May 14, 2013

(54) EXPLOSION-PROOF DEVICE INCLUDING BATTERY COVER WITH RUPTURE FILM POSITIONED IN VALVE SEAT FOR USE IN POWER BATTERIES

(75) Inventors: Peng Wang, Dongguan (CN); Ping-hua Deng, Dongguan (CN); Biao Jin, Dongguan (CN); Zhi-jun Guo, Dongguan (CN)

(73) Assignee: Dongguan Amperex Electronics Technology Limited, Dongguan, Guangdong Province (CN)

( * ) Notice: Subject to any disclaimer, the term of this patent is extended or adjusted under 35 U.S.C. 154(b) by 229 days.

(21) Appl. No.: 13/008,626

(22) Filed: Jan. 18, 2011

(65) Prior Publication Data

US 2012/0015219 A1 Jan. 19, 2012

(30) Foreign Application Priority Data

Jul. 15, 2010 (CN) .......................... 2010 1 0233329

(51) Int. Cl.
*H01M 2/12* (2006.01)
(52) U.S. Cl.
USPC ............................................... 429/56; 429/53

(58) Field of Classification Search .................... 429/53, 429/56
See application file for complete search history.

(56) References Cited

U.S. PATENT DOCUMENTS

| 6,468,692 | B1 * | 10/2002 | Nemoto et al. ............... 429/174 |
| 6,818,342 | B1 * | 11/2004 | Okamoto et al. ............. 429/56 |
| 2010/0233520 | A1 * | 9/2010 | Suzuki et al. ................ 429/56 |

FOREIGN PATENT DOCUMENTS

JP 4386139 B1 * 12/2009

* cited by examiner

*Primary Examiner* — Basia Ridley
*Assistant Examiner* — Sean P Cullen
(74) *Attorney, Agent, or Firm* — Alston & Bird LLP

(57) ABSTRACT

An explosion-proof device for use in power batteries includes a battery cover defining an explosion-proof hole, a valve seat securely mounted in the explosion-proof hole and hermetically sealing the battery cover, and a rupture film positioned in the valve seat and hermetically sealing the explosion-proof hole. The rupture film is insulatively isolated from the valve seat via an insulative cushion enclosing the rupture film, or an insulative layer formed on the rupture film. In the explosion-proof device of the prevent invention, the rupture film is insulatively isolated from the valve seat, which can prevent the rupture film from being electrochemically corroded.

10 Claims, 3 Drawing Sheets

EXPLOSION-PROOF DEVICE INCLUDING BATTERY COVER WITH RUPTURE FILM POSITIONED IN VALVE SEAT FOR USE IN POWER BATTERIES

CROSS-REFERENCE TO RELATED APPLICATION

The present patent application claims the benefit of Chinese Patent Application No. 201010233329.4, filed Jul. 15, 2010, the disclosure of which is hereby incorporated herein by reference in its entirety.

FIELD OF THE INVENTION

The present invention relates to power batteries and, more particularly, to an explosion-proof device with desirable safety performance for use in power batteries.

BACKGROUND OF THE INVENTION

With increasing popularization of power batteries, especially power batteries with high capacity over 10 AH, more and more attentions have been paid to the safety performance of the power batteries.

Typically, a conventional power battery includes a battery cover defining an explosion-proof hole. A rupture film of copper foil is mounted in the explosion-proof hole via welding for sealing the same. When the air pressure in the power battery exceeds a predetermined value, the rupture film of copper foil will break, so as to prevent the power battery from exploding due to excessive air pressure in the power battery.

However, the rupture film of copper foil exposed to the external circumstance and the electrolyte is apt to be corroded by the circumstance and electrolyte. Additionally, the rupture film of copper foil is soldered on the can housing of steel. Due to a potential difference between the copper foil and the steel can housing, electrochemical corrosion may occur.

What is needed, therefore, is to provide an explosion-proof device for use in power batteries, which can prevent the occurrence of electrochemical corrosion of the rupture film.

SUMMARY OF THE INVENTION

One object of the present invention is to provide an explosion-proof device for use in power batteries, which can prevent occurrence of electrochemical corrosion of the rupture film.

According to one embodiment of the present invention, an explosion-proof device for use in power batteries includes a battery cover defining an explosion-proof hole, a valve seat securely mounted in the explosion-proof hole and hermetically sealing the battery cover, and a rupture film securely positioned in the valve seat and sealing the explosion-proof hole. The rupture film is insulatively isolated from the valve seat.

According to one aspect of the present invention, the rupture film is insulatively isolated from the valve seat via an insulative cushion enclosing the rupture film, or an insulative layer formed on the rupture film.

According to one aspect of the present invention, t the insulative cushion is made from insulative rubber or insulative plastic.

According to one aspect of the present invention, the rupture film is coated with a layer of insulative rubber, insulative plastic or insulative paint.

According to one aspect of the present invention, the valve seat is formed with an upper supporting portion at an upper side thereof, and the rupture film is situated on the upper supporting portion and securely pressed against the upper supporting portion via a middle pressing member.

According to one aspect of the present invention, an upper protective film is arranged at an upper side of the rupture film, and a lower protective film is arranged at a lower side of the rupture film.

According to one aspect of the present invention, the valve seat is formed with a lower supporting portion at a lower side thereof, the lower protective film is seated on the lower supporting portion and is securely resisted on the lower supporting portion via a lower pressing member.

According to one aspect of the present invention, the valve seat is formed with an upper supporting portion at an upper side thereof, the rupture film is positioned on the upper supporting portion and pressed against the upper supporting portion via a middle pressing member, the upper protective film is sandwiched between the middle pressing member and an upper pressing member.

According to one aspect of the present invention, the upper pressing member, the middle pressing member and the lower pressing member are made from aluminum alloy, metal, plastic, rubber or ceramic.

According to one aspect of the present invention, the upper pressing member, the middle pressing member and the lower pressing member are mounted in the valve seat via thread connection or interference fit.

According to one aspect of the present invention, the upper protective film and the lower protective film are made from polypropylene film, polyethylene terephthalate film polytetrafluoroethylene film or metal film having a thickness of 30 µm to 200 µm.

According to one aspect of the present invention, the upper protective film and the lower protective film each have strength less than that of the rupture film.

According to one aspect of the present invention, the rupture film has a thickness of 5 µm to 50 µm and is made from aluminum foil, nickel foil, copper foil or zinc foil.

According to one aspect of the present invention, the valve seat and the battery cover are made from stainless steel or aluminum alloy, and the valve seat hermetically seals the battery cover via welding, thread connection or rivet connection The explosion-proof device according to one embodiment of the present invention at least has the following advantages relative to the prior art. The rupture film securely fixed to the valve seat via pressing is insulatively isolated from the valve seat and, therefore, electrochemical corrosion due to direct contact of the rupture film and the valve seat is remarkably reduced. Additionally, the rupture film is positioned between the upper protective film and the lower protective film. Oxidation corrosion of the rupture film due to exposure to the external environment and the electrolyte corrosion due to exposure to the electrolyte are avoided. The upper protective film can also prevent the rupture film from being damaged by external force.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Figure 1:
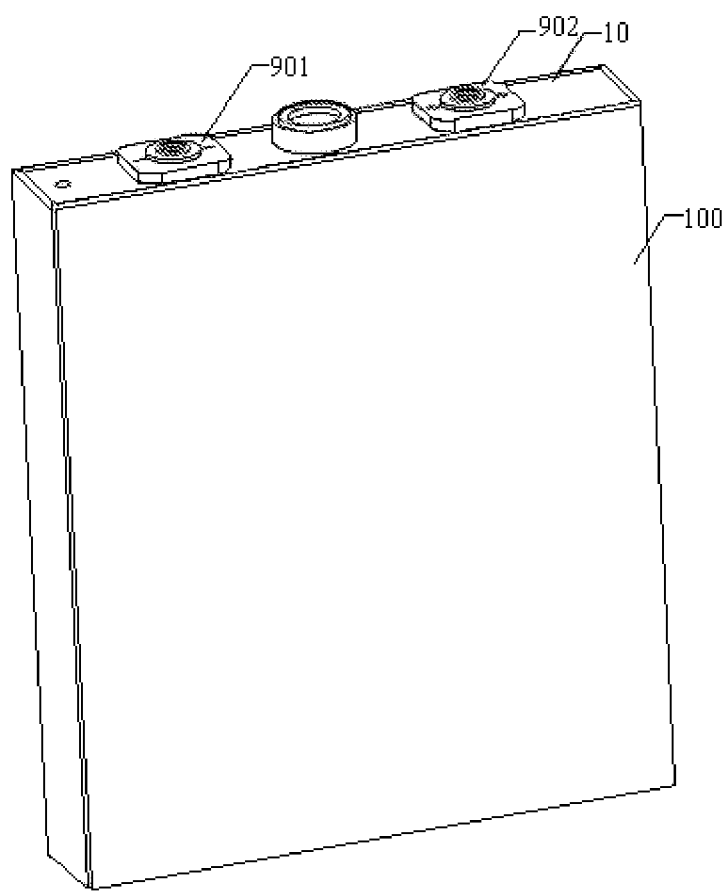
FIG. 1 depicts a perspective view of a power battery having an explosion-proof device according to one embodiment of the present invention.

Referring to FIG. 1, a power battery equipped with an explosion-proof device in accordance with one embodiment of the present invention includes a can housing 100, a battery cell (not shown) received in the can housing 100, electrolyte (not shown) filled in the can housing 100 and a battery cover 10 mounted on the top of the can housing 100 for sealing the same. A positive pole 901 and a negative pole 902 electrically connecting the battery cell extend out of the battery cover 10 to electrically connect an external circuit or electric equipment.

Figure 2:
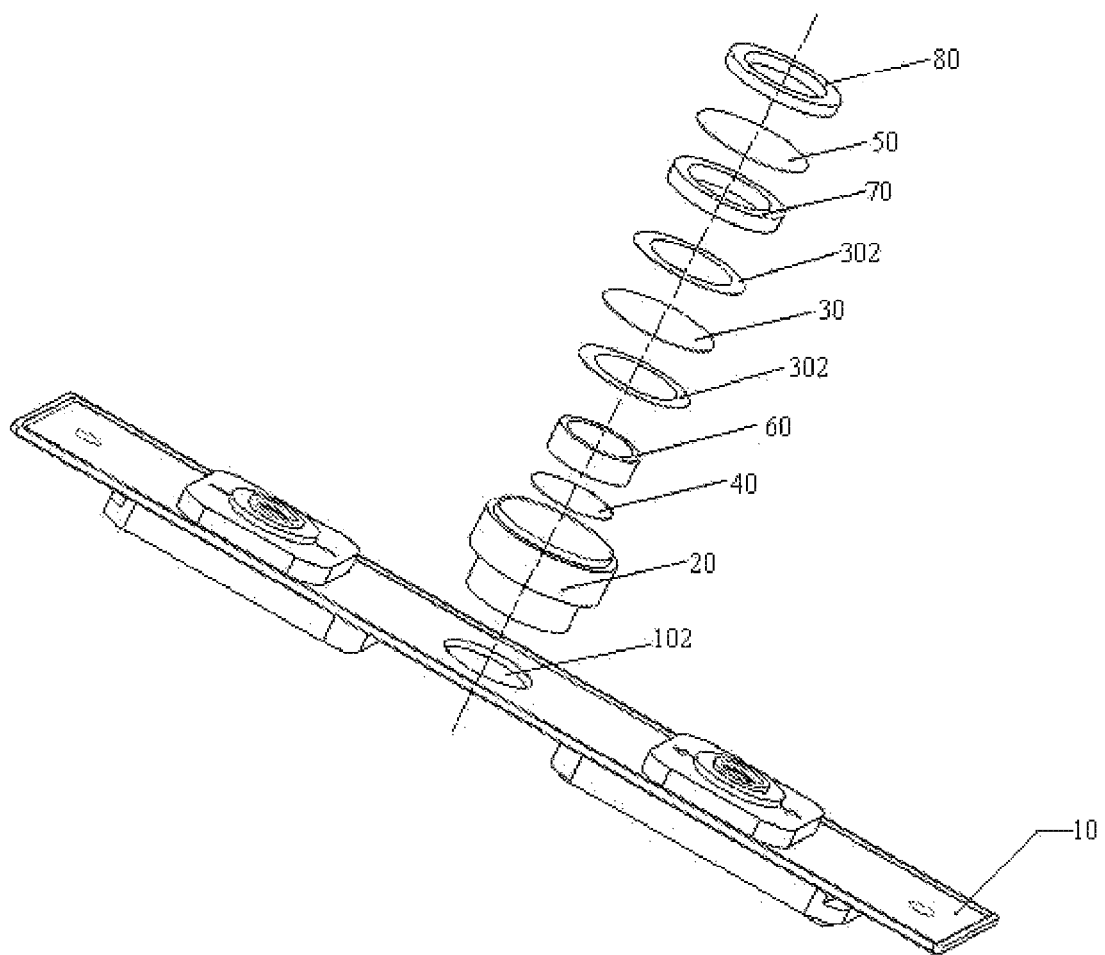
FIG. 2 depicts an exploded view of the explosion-proof device according to one embodiment of the present invention.
Figure 3:
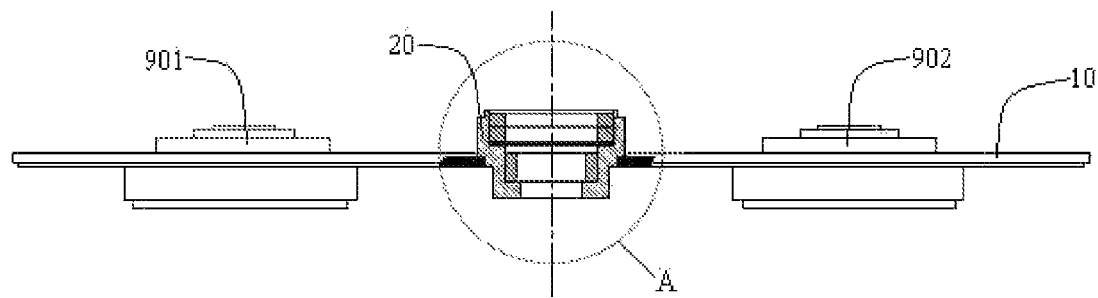
FIG. 3 depicts a cross-sectional view of an assembled explosion-proof device as shown in FIG. 2.
Figure 4:
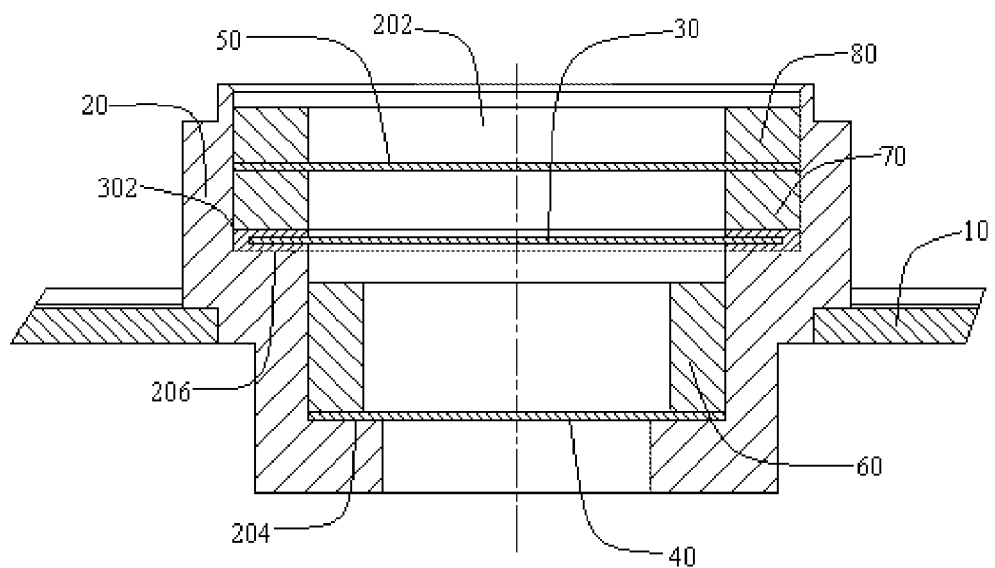
FIG. 4 depicts an enlarged view of a circled portion A as shown in FIG. 3.

Referring particularly to FIG. 2 to FIG. 4, the explosion-proof device according to one embodiment of the present invention includes a battery cover 10 defining an explosion-proof hole 102 at a center thereof, a valve seat 20 securely positioned in the explosion-proof hole 102, a rupture film 30 insulatively secured to the valve seat 20 and sealing the explosion-proof hole 102, an upper protective film 50 disposed at an upper side of the rupture film 30, and a lower protective film 40 disposed at lower side of the rupture film 30. The upper protective film 50 and the lower protective film 40 each have strength less than the strength of the rupture film 30.

The valve seat 20 is a hollow column. The valve seat 20 and the battery cover 10 are made from stainless steel or aluminum alloy. The valve seat 20 defines a stepped through hole 202 at a center thereof. The through hole 202 is in communication with the explosion-proof hole 102 defined in the battery cover 10. Around the through hole 202, the inner wall of the valve seat 20 is provided with a lower supporting portion 204 at a lower side thereof and an upper supporting portion 206 at an upper side thereof.

The valve seat 20 is securely seated in the explosion-proof hole 102 defined in the battery cover 10. There is no particular limitation to the way how the valve seat 20 is coupled to the battery cover 10 as long as the explosion-proof hole 102 is hermetically sealed. For instance, according to one embodiment of the present invention, the valve seat 20 is coupled to the battery cover 10 via welding. Alternatively, the valve seat 20 can also be coupled to the battery cover 10 via thread connection or rivet connection.

The rupture film 30 is made from aluminum foil having a thickness of 5 μm to 50 μm. The rupture film 30 is fixed in the valve seat 20 and hermetically seals the through hole 202. According to an alternative embodiment of the present invention, the rupture film 30 can also be made from nickel foil, copper foil or zinc foil.

The lower protective film 40 and the upper protective film 50 each have a thickness of 30 μm to 200 μm. The lower protective film 40 and the upper protective film 50 can be made from plastic film, such as polypropylene film, polyethylene terephthalate film and polytetrafluoroethylene film, or can be made from metal film.

The lower protective film 40 is securely positioned on the lower supporting portion 204 via a lower pressing member 60. The lower pressing member 60 is a hollow column which has a shape corresponding to the shape of the through hole 202. The outer diameter of the lower pressing member 60 is corresponding to the diameter of the through hole 202 between the lower supporting portion 204 and the upper supporting portion 206. The inner diameter of the lower pressing member 60 is slightly less than the diameter of the through hole 202 below the lower supporting portion 204. After the lower protective film 40 is situated on the lower supporting portion 204 formed on the valve seat 20, the lower pressing member 60 is safely positioned in the through hole 202 via interference fit or thread connection for tightly resisting the lower protective film 40 against the lower supporting portion 204. The lower protective film 40 can isolate the rupture film 30 from the electrolyte and prevent the rupture film 30 from being corroded by the electrolyte.

The rupture film 30 is tightly pressed on the upper supporting portion 206 via a middle pressing member 70. The upper protective film 50 is securely mounted on the middle pressing member 70 via an upper pressing member 80. The upper protective film 50 can prevent the rupture film 30 from being corroded by the external environment. In the embodiment as illustrated, the middle pressing member 70 and the upper pressing member 80 are securely mounted in the through hole 202 via interference fit. According to an alternative embodiment of the present invention, the middle pressing member 70 and the upper pressing member 80 can also be securely assembled in the through hole 202 via thread connection.

In the illustrated embodiment, the lower pressing member 60, the middle pressing member 70 and the upper pressing member 80 can be made from metal, plastic, aluminum alloy, rubber or ceramic.

Referring to FIG. 2 and FIG. 4, for insulatively isolating the rupture film 30 from the valve seat 20, in the embodiment as illustrated, an insulative cushion 302 made from insulative rubber or insulative plastic with desirable insulating property is arranged between the rupture film 30 and the valve seat 20. The insulative cushion 302 encloses the periphery of the rupture film 30. According to an alternative embodiment of the present invention, the rupture film 30 is coated with an electrically insulative material layer, for instance insulative paint, insulative rubber or insulative plastic, to insulatively isolate the rupture film 30 from the valve seat 20.

Referring to FIG. 2 to FIG. 4, the assembly of the explosion-proof device according to one embodiment of the present invention will be detailed below. Firstly, the lower protective film 40 is placed on the lower supporting portion 204 of the valve seat 20. The lower pressing member 60 is positioned in the through hole 202 and tightly resists the lower protective film 40 on the lower supporting portion 204 via interference fit. Secondly, the rupture film 30 enclosed by the insulative cushion 302 or coated with an insulative material layer is situated on the upper supporting portion 206. The rupture film 30 is spaced apart from the top of the lower pressing member 60. The middle pressing member 70 is tightly mounted on the rupture film 30 via interference fit. The rupture film 30 hermetically seals the through hole 202. Thirdly, the upper protective film 50 is seated on the top of the middle pressing member 70 and is further tightly resisted against the middle pressing member 70 via the upper pressing member 80. Lastly, the valve seat 20 as previously assembled is positioned in the explosion-proof hole 102 and coupled to the battery cover 10 via welding, thread connection or rivet connection, so as to hermetically seal the explosion-proof hole 102.

In view of the foregoing detailed description, the explosion-proof device in accordance with one embodiment of the present invention has the following advantages over the prior art. The rupture film 30 securely fixed to the valve seat 20 is insulatively isolated from the valve seat 20 and, therefore, electrochemical corrosion due to direct contact of the valve seat 20 and the rupture film 30 is remarkably reduced. Additionally, the rupture film 30 is positioned between the upper protective film 50 and the lower protective film 40. Oxidation corrosion of the rupture film 30 due to exposure to the external environment and the electrolyte corrosion due to exposure to the electrolyte are avoided. The upper protective film 50 can also prevent the rupture film 30 from being damaged by external force.

While the present invention has been illustrated by the above description of the preferred embodiments thereof, while the preferred embodiments have been described in considerable detail, it is not intended to restrict or in any way to limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. An explosion-proof device for use in power batteries, said device comprises:
    a battery cover defining an explosion-proof hole;
    a valve seat securely mounted in the explosion-proof hole and hermetically sealing the battery cover; and
    a rupture film positioned in the valve seat and hermetically sealing the explosion-proof hole,
    wherein:
        the rupture film is insulatively isolated from the valve seat;
        an upper protective film is arranged at an upper side of the rupture film, and a lower protective film is arranged at a lower side of the rupture film;
        the valve seat is formed with a lower supporting portion at a lower side thereof, the lower protective film is seated on the lower supporting portion and is securely resisted on the lower supporting portion via a lower pressing member; and
        the valve seat is formed with an upper supporting portion at an upper side thereof, the rupture film is positioned on the upper supporting portion and pressed against the upper supporting portion via a middle pressing member, the upper protective film is sandwiched between the middle pressing member and an upper pressing member.

2. The explosion-proof device of claim 1, wherein the rupture film is insulatively isolated from the valve seat via an insulative cushion enclosing the rupture film, or an insulative layer formed on the rupture film.

3. The explosion-proof device of claim 2, wherein the insulative cushion is made from insulative rubber or insulative plastic.

4. The explosion-proof device of claim 1, wherein the rupture film is coated with a layer of insulative rubber, insulative plastic or insulative paint.

5. The explosion-proof device of claim 1, wherein the upper pressing member, the middle pressing member and the lower pressing member are made from aluminum alloy, metal, plastic, rubber or ceramic.

6. The explosion-proof device of claim 1, wherein the upper pressing member, the middle pressing member and the lower pressing member are mounted in the valve seat via thread connection or interference fit.

7. The explosion-proof device of claim 1, wherein the upper protective film and the lower protective film are made from polypropylene film, polyethylene terephthalate film polytetrafluoroethylene film or metal film having a thickness of 30 μm to 200 μm.

8. The explosion-proof device of claim 1, wherein the upper protective film and the lower protective film each have strength less than that of the rupture film.

9. The explosion-proof device of claim 1, wherein the rupture film has a thickness of 5 μm to 50 μm and is made from aluminum foil, nickel foil, copper foil or zinc foil.

10. The explosion-proof device of claim 1, wherein the valve seat and the battery cover are made from stainless steel or aluminum alloy, and the valve seat hermetically seals the battery cover via welding, thread connection or rivet connection.

* * * * *